United States Patent
Diaz Cuellar et al.

(10) Patent No.: US 10,193,863 B2
(45) Date of Patent: Jan. 29, 2019

(54) ENFORCING NETWORK SECURITY POLICY USING PRE-CLASSIFICATION

(71) Applicant: Microsoft Technology Licensing, LLC, Redmond, WA (US)

(72) Inventors: Gerardo Diaz Cuellar, Kirkland, WA (US); Praveen Balasubramanian, Redmond, WA (US); Hossam Fattah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 15/402,237

(22) Filed: Jan. 10, 2017

(65) Prior Publication Data

US 2018/0103010 A1   Apr. 12, 2018

Related U.S. Application Data

(60) Provisional application No. 62/405,858, filed on Oct. 7, 2016.

(51) Int. Cl.
*H04L 29/06* (2006.01)
*H04L 12/851* (2013.01)

(52) U.S. Cl.
CPC ...... *H04L 63/0263* (2013.01); *H04L 47/2441* (2013.01); *H04L 63/0227* (2013.01); *H04L 63/1408* (2013.01); *H04L 63/164* (2013.01); *H04L 63/166* (2013.01)

(58) Field of Classification Search
CPC .................................................. H04L 63/0263
See application file for complete search history.

(56) References Cited

U.S. PATENT DOCUMENTS

| | | | |
|---|---|---|---|
| 6,594,268 B1 * | 7/2003 | Aukia | ..................... H04L 45/04 370/230 |
| 6,633,860 B1 | 10/2003 | Afek et al. | |
| 6,857,018 B2 | 2/2005 | Jiang | |
| 6,859,455 B1 | 2/2005 | Yazdani et al. | |

(Continued)

FOREIGN PATENT DOCUMENTS

| | | |
|---|---|---|
| EP | 2139199 A2 | 12/2009 |
| WO | 2005064495 A9 | 8/2005 |
| WO | 2015094372 A1 | 6/2015 |

OTHER PUBLICATIONS

Chen et al.; A packet pre-classification CSMA/CA MAC protocol for IP over WDM ring networks; Published in: The 8th International Conference on Communication Systems, 2002. ICCS 2002; Date of Conference: Nov. 28-28, 2002; IEEE Xplore (Year: 2002).*

(Continued)

*Primary Examiner* — Bradley Holder

(57) ABSTRACT

A computer system enforces network security policy by pre-classifying network traffic. Unidimensional pre-classifier filters analyze network traffic to populate a pre-classifier bit array. Rather than having filter explosion with the creation of multidimensional filters, the pre-classifier bit array is used by other layers and/or filters to enforce network security policy. Further, reclassification of network traffic due to network security changes is streamlined due to the inclusion of pre-classifier layers and the pre-classifier bit array.

20 Claims, 6 Drawing Sheets

(56) References Cited

U.S. PATENT DOCUMENTS

| | | | |
|---|---|---|---|
| 7,023,852 B1* | 4/2006 | Mar | H04L 45/308 370/252 |
| 7,154,888 B1 | 12/2006 | Li et al. | |
| 7,308,711 B2 | 12/2007 | Swander et al. | |
| 7,433,304 B1 | 10/2008 | Galloway et al. | |
| 8,027,330 B2 | 9/2011 | Paddon et al. | |
| 8,949,413 B2 | 2/2015 | Ramaraj et al. | |
| 9,246,775 B2 | 1/2016 | Esserman et al. | |
| 2003/0123447 A1* | 7/2003 | Smith | H04L 47/10 370/394 |
| 2005/0060295 A1 | 3/2005 | Gould et al. | |
| 2008/0008202 A1* | 1/2008 | Terrell | H04L 45/00 370/401 |
| 2008/0148341 A1 | 6/2008 | Ferguson et al. | |
| 2012/0239652 A1* | 9/2012 | Wood | G06F 17/30516 707/737 |
| 2013/0223446 A1* | 8/2013 | Ernstrom | H04L 47/2441 370/392 |
| 2013/0247197 A1 | 9/2013 | O'Brien | |
| 2013/0250763 A1* | 9/2013 | Assarpour | H04L 47/12 370/235 |
| 2015/0341473 A1* | 11/2015 | Dumitrescu | H04L 69/22 370/392 |
| 2016/0182555 A1 | 6/2016 | Grzelak | |
| 2017/0099197 A1* | 4/2017 | Raney | H04L 43/028 |
| 2018/0241699 A1* | 8/2018 | Raney | H04L 49/552 |

OTHER PUBLICATIONS

Crotti et al.; Optimizing statistical classifiers of network traffic; Published in: Proceeding IWCMC '10 Proceedings of the 6th International Wireless Communications and Mobile Computing Conference; pp. 758-763; 2010; ACM Digital Library (Year: 2010).*

"International Search Report and Written Opinion Issued in PCT Application No. PCT/US2017/054807", dated Dec. 19, 2017, 11 Pages.

"Split and smear" your security policies: Static Unidimensional vs. Dynamic Multi-Dimensional Policies, Published on: Feb. 22, 2016, 8 pages, Available at: http://blogs.vmware.com/networkvirtualization/2016/02/split-smear-security-policies-static-unidimensional-vs-dynamic-multi-dimensional-policies.html#V8_me_I94dU.

Al-Shaer, et al., "Design and Implementation of Firewall Policy Advisor Tools", In Technical Report of DePaul University, Aug. 2002, pp. 1-21.

"ALE Layers", Windows Dev Center, 2016, 3 pages, Available at: https://msdn.microsoft.com/en-us/library/windows/desktop/bb613460(v=vs.85).aspx.

"Filtering Layer Identifiers", Windows Dev Center, Retrieved on: Jan. 6, 2016, 9 pages, Available at: https://msdn.microsoft.com/en-us/library/windows/desktop/aa366492(v=vs.85).aspx.

* cited by examiner

ENFORCING NETWORK SECURITY POLICY USING PRE-CLASSIFICATION

CROSS-REFERENCE TO RELATED APPLICATION

This application claims the benefit of U.S. Provisional Patent Application Ser. No. 62/405,858, filed Oct. 7, 2016, entitled "Enforcing Network Security Policy Using Pre-Classification", the entirety of which is hereby incorporated by reference herein.

BACKGROUND

Enforcement of network security policy has become increasingly important as well as increasingly difficult. High-level security policy is converted into many different filters and/or rules which are enforced in various layers throughout the network stack to provide effective and customizable protection against viruses and/or a variety of other network-based attacks. The filters may be multidimensional, checking a variety of different network traffic properties against potentially large sets and/or ranges of values. The enforcement system must frequently enforce one or more rules that require processing of a cross product of many sets of values. creating a combinatorial "explosion" of filters.

Due to filter explosion, policies and resulting filters become too large to effectively process in a reasonable amount of time. It also becomes difficult to add, remove, or enumerate the filters because of the large number of them. Additionally, because the filters enforcing the policy are very complex, it is difficult to make modifications to the policies. Further, efficient match lookup techniques, such as hashing, are not practical due to the multidimensional nature of many of the filters. When a classification of network traffic is completed at one layer of the network stack, the classification work may not be reusable in another layer due to differences in the complex filters at each level. These issues result in more memory and processor resource consumption than necessary in the data path and when a policy is enforced and modified.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computerized method comprises receiving, by a processor, network traffic; classifying, in at least one pre-classifier layer, the network traffic based on at least one network traffic property; populating, by the processor, at least one pre-classifier bit array based on at least one result of classifying the network traffic in the at least one pre-classifier layer; comparing, in at least one network security layer, at least one bit of the at least one pre-classifier bit array with at least one filter condition; allowing, in the at least one network security layer, the network traffic when the comparing indicates allowance of the network traffic; and blocking, in the at least one network security layer, the network traffic when the comparing indicates blocking of the network traffic.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

In FIGS. 1 to 6, the systems are illustrated as schematic drawings. The drawings may not be to scale.

DETAILED DESCRIPTION

Figure 1:
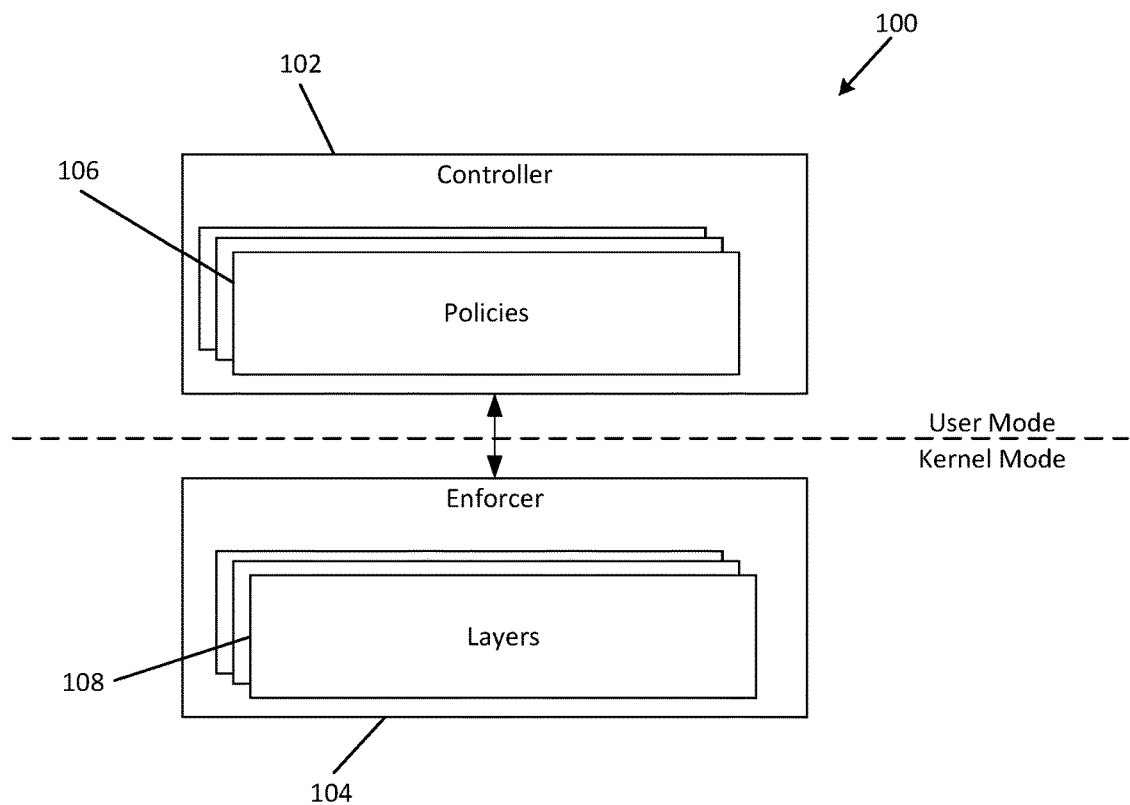
FIG. 1 illustrates a block diagram of an example system including a controller and an enforcer.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices. The terms 'computer', 'computing apparatus', 'mobile device' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, wearables, media players, games consoles, personal digital assistants, and many other devices.

The computer systems described herein reduce reliance on multidimensional filtering with the addition of unidimensional pre-classifier layers. Network traffic is pre-classified prior to applying other filters. The use of unidimensional pre-classifier filters that are used to populate a pre-classifier bit array reduces and/or eliminates "filter explosion" that results from traditional multidimensional filtering. Thus, the quantity of filters needed overall is also reduced from exponential to linear. The time and processor resources needed to plumb these filters or enumerate them is also reduced significantly. Further, work done in the pre-classifier layers is preserved in the pre-classifier bit array for use by other layers and/or filters. These other layers and/or filters may merely access bits on the bit array populated by the pre-classifier layers, rather than classifying against network traffic properties repeatedly with multiple variables.

Further, classification against unidimensional filters may make use of efficient techniques such as hashing, search trees, and the like. For example, the complexity is order O(n) where n represents the bits of the value, which is very efficient compared to order O(f) where f is the number of filters. As such, the disclosure is close to constant time (e.g., performing a few operations to search instead of going through all the unidimensional filters).

Reclassification of network traffic due to network security policy changes is streamlined due to the inclusion of pre-classifier layers and the pre-classifier bit array.

Aspects of the disclosure improve the functioning of computing devices at least through a high reduction in memory consumption and a reduction in processor usage. For example, the filters are allocated non-paged pool memory. The disclosure uses significantly less paged pool memory. The processor utilization of policy pushes of the filters, as well as start, policy change, and network transitions, is greatly reduced.

While described in some implementations with reference to network security policies, the disclosure is operable with any form of filtering policy. For example, the disclosure is operable with power management policies, throttling policies, and other policies.

FIG. 1 illustrates a computer system 100 comprising a controller 102 and an enforcer 104. The controller 102 (e.g., a firewall application) may be a software module that handles high level network security policies, including policies of the operating system (OS), policies enacted by a system administrator, specific firewall policies, Internet protocol security (IPSEC) policies, etc. The enforcer 104 (e.g., a filtering platform) may be a software module that enforces the security policies of the controller by filtering network traffic according to a variety of filters in various network security layers (e.g., TCP/IP layers, OSI layers, pre-classifier layers, etc.). In an example, the controller 102 operates at a user level and the enforcer 104 operates at a kernel level.

The controller 102 transforms network security policies 106, which may be in the form of dynamic and/or abstracted goals for network security enforcement, into filters that may include more specific and/or logical conditions that are checked for satisfaction and/or classification. The filters may be enforced at one or more network security layers 108 by the enforcer 104 to enact the higher level policies.

In an example, network security policies 106 may be associated with different tenants and/or sources. The network security policies 106 may be enforced in a specific order based on preference, priority, or the like. For instance, policies specifically set by a system administrator may be enforced at a higher priority than general security policies.

Further, network security policies 106 may comprise a combination of requirements and/or conditions that result in filtering based on comparison of network traffic properties to sets of elements, values, or the like. For instance, network traffic may be ultimately allowed or denied based on whether the traffic originates from a set of allowed addresses, whether the traffic is associated with a set of restricted protocols, etc. The policy set comparisons may be transformed into filters that test incoming traffic against ranges of allowed addresses or sets of protocol names or identifiers, or any combination thereof, in various layers 108 of the enforcer 104.

In an example in which the enforcer 104 includes pre-classifier layers (shown in FIG. 2), the controller 102 creates filters in the pre-classifier layers that test a property of network traffic against elements of the above described sets. The controller 102 further assigns each set to one or more bits in a pre-classifier bit array. A pre-classifier filter that tests against elements in a set sets a bit in the pre-classifier bit array based on the results of the test. The pre-classifier bit array is associated with the pre-classifier filter. The bit is a position in the pre-classifier bit array. The enforcer 104 then enforces the set-based policies of the controller 102 using the pre-classifier bit array in traditional network security layers (e.g., layers that perform an allow action or a block action) and/or other pre-classifier layers (e.g., in instances where there are pre-classifier layers of multiple variables). The pre-classifier bit array may be used by other filters in other layers, as described below.

Figure 2:
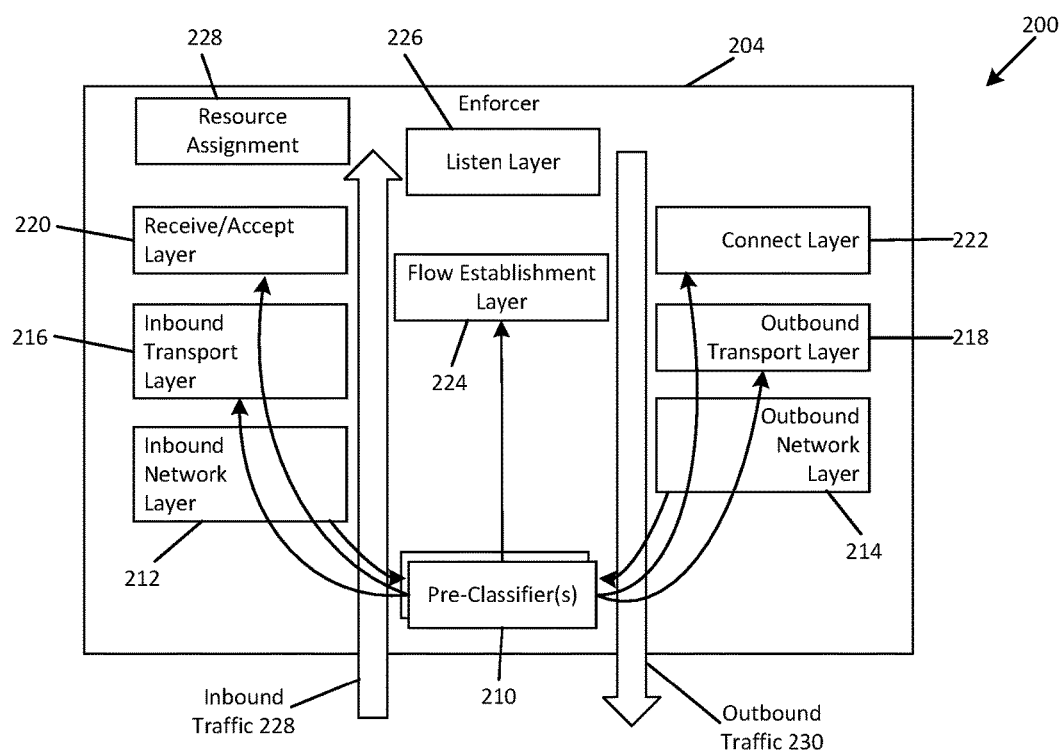
FIG. 2 illustrates a block diagram of an example enforcer including network security layers.

FIG. 2 illustrates a diagram 200 of an enforcer 204 including network layers (e.g., layers 108, etc.) according to an example. Inbound traffic 228 and outbound traffic 230 passes through and/or is blocked by the layers of the enforcer 204. One or more pre-classifier layers 210 operate on data to populate the pre-classifier bit array, which is shared with other layers. For example, in the receive path, the enforcer 204 includes the pre-classifier layers 210, an inbound network layer 212, an inbound transport layer 216, and a receive/accept layer 220. The inbound network layer 212 is typically located in the receive path just after the IP header of a received packet has been parsed but before any IP header processing takes place. However, in FIG. 2, the inbound network layer 212 leverages the pre-classifier bit array populated by the pre-classifier layers 210. The inbound transport layer 216 is located in the receive path just after a received packet's transport header has been parsed by the network stack at the transport layer. The receive/accept layer 220 allows for authorizing accept requests for incoming TCP connections, as well as authorizing incoming non-TCP traffic based on the first packet received.

In the send path, the enforcer 204 includes the pre-classifier layers 210, a connect layer, 222, an outbound transport layer 218, and an outbound network layer 214. The connect layer 222 allows for authorizing connect requests for outgoing TCP connections, as well as authorizing outgoing non-TCP traffic based on the first packet sent. The outbound transport layer 218 is located in the send path just after a sent packet has been passed to the network layer for processing but before any network layer processing takes place. The outbound network layer 214 processes packets for delivery over the network.

The enforcer 204 further includes a flow establishment layer 224, a listen layer 226, and a resource assignment layer 228. The flow establishment layer 224 allows for notification of when a TCP connection has been established, or when non-TCP traffic has been authorized. The listen layer 226 authorizes TCP listen requests. The resource assignment layer 228 allocates resources, such as authorizing transport port assignments, bind requests, promiscuous mode requests, and raw mode requests.

A layer of the enforcer 204 may be associated with policy. The policy of the layer may be consulted and used to classify network traffic that crosses a specific path in the network stack. For instance, the inbound transport layer 216 may include policy that classifies network traffic based on logical addressing of the network traffic, etc. Further, a layer may include one or more sub-layers, which are divisions in a layer that may represent separate policy sources and/or other layer differences. For instance, logical address classification may be affected by multiple high level policies, so the inbound transport layer 216 may include sub-layers for each of the high level policies that affects the classification of network traffic based on logical addressing. In an example, when the classifications of each sub-layer in a layer are in agreement to allow network traffic (e.g., inbound traffic 228, outbound traffic 230, etc.), the layer allows network traffic and, when the classification of one or more of the sub-layers is not in agreement to allow network traffic, the associated layer blocks network traffic.

Each layer of the enforcer 204 comprises filters, or rules, which are specific units of policy enforcement. A filter specifies conditions and/or values to test against using network traffic properties and actions to take based on the results of the test, classifying the network traffic with respect to the filter conditions. Network traffic properties may include a source address, a destination address, a source port, a destination port, a local address, a remote address, a local port, a remote port, an application name and/or application identifier, a protocol (e.g., transmission control protocol (TCP), user datagram protocol (UDP), Internet control message protocol (ICMP), and generic routing encapsulation (GRE)), other network traffic metadata, etc. It should be understood that network traffic may be composed of units such as packets, frames, datagrams and/or segments, etc. according to networking principles as understood by those skilled in the art. The metadata included in the units of network traffic may be properties upon which the associated network traffic may be filtered, such as the network interface on which the network traffic arrived or is being sent, the type of network interface, the application receiving or sending the date, etc.

Network traffic may be connection-oriented (e.g., TCP network traffic, etc.) or connectionless (e.g., UDP network traffic, etc.). In an example where the network traffic is connection-oriented, the enforcer 204 may store metadata associated with the network traffic upon determining the type of the network traffic. The metadata may be referred to as a connection data structure or flow. The connection data structure may store information about the network traffic, such as source address, destination address, port information, protocol information, and other metadata properties. In an example where the network traffic is connectionless, the enforcer 204 may store metadata and/or create a data structure similar to the connection data structure for the connectionless network traffic. In some examples, data for the connectionless network traffic is stored, or referred to, as a flow (e.g., for UDP or ICMP traffic).

A layer of the enforcer and/or a filter of a layer may be multidimensional or unidimensional. A multidimensional layer (e.g., layers 212-222, etc.) or filter enforces policy based on filtering, classifying, and/or testing for multiple conditions and/or values against multiple network traffic properties, each of which may have a different data type. A unidimensional layer or filter enforces policy based on filtering, classifying, and/or testing a single network traffic property against values and/or conditions. It should be understood that unidimensional filters enable more efficient overall policy matching by using pre-classifier layers, and more efficient pre-classifier layer because being unidimensional enables trie matching. The resultant filters after pre-classification are easier to hash. These techniques may not be possible with multidimensional filters due to the inclusion of multiple network traffic properties and the possibility of the network traffic properties being of different data types.

In an example, the conditions of the filters in the layers of the enforcer 204 are based on the policies of the controller 102 as described above. A filter may include conditions that are user-defined based on a policy and/or conditions that are derived from a policy based on logic, algorithms, etc.

The pre-classifier layers 210 are invoked before the other layers (e.g., layers 212-222, etc.) of the enforcer 204. Each pre-classifier layer 210 comprises unidimensional filters. Each pre-classifier layer 210 may include only one filter, or may have more than one filter. For example, unidimensional pre-classifier layers 210 test only one network property. The pre-classifier layer 210 may be multidimensional, but it would then not be able to take advantage of a trie. The pre-classifier filters classify the network traffic based on testing network traffic properties against values and/or sets of elements/values. Further, each pre-classifier filter sets one bit in a pre-classifier bit array based on testing the network traffic properties, preserving the classification information for use by other layers/filters. On each pre-classification, several filters may be matched, thereby adding several bits in the pre-classifier bit array. For instance, a pre-classifier filter may test whether the eight most significant bits of a source address of the current network traffic match a defined set of eight bits. If the groups of bits match, the pre-classifier filter may set a bit in the associated pre-classifier bit array to '1'. Alternatively, if the groups of bits do not match, no bits in the associated pre-classifier bit array are set as a result. All pre-classifier layers that include filters are invoked prior to traditional layers. Pre-classifier filters may even be used on layers that assume an endpoint will be created, or on layers that will create endpoint.

The pre-classifier bit array is associated with specific network traffic and is stored such that it is accessible by all of the layers (e.g., layers 212-222, etc.) of the enforcer 204. For instance, the network traffic classified by the pre-classifier layers may include an associated connection data structure (or a flow data structure such as ALE_FLOW, an endpoint data structure such as ALE_ENDPOINT, etc.) accessible by all the layers (e.g., layers 212-222, etc.) of the enforcer 204. The pre-classifier bit array is populated by the pre-classifier layers and stored in the connection data structure (e.g., as metadata) and then accessed by filters on the other layers of the enforcer as described herein. The storage of the pre-classifier bit array may depend on a property of the network traffic, with one pre-classifier bit array per pre-classified network property. For instance, if the network traffic is connectionless (e.g., UDP traffic), a different data structure may be used than if the network traffic is connection-oriented (e.g., TCP traffic). Alternatively, or additionally, pre-classifier bit arrays may be included in redirecting records and/or other data structures for use in classifying outbound network traffic (e.g., outbound traffic 230). In some examples, redirecting records are used to redirect connections.

In an example, the traditional layers (e.g., layers 212-222, etc.), or the layers of the enforcer 204 other than the pre-classifier layers, access the pre-classifier bit array to classify the network traffic according the filters within the traditional layers. For instance, one or more of the traditional layers may include a filter that classifies and/or filters the network traffic based on a range of allowed addresses. The pre-classifier bit array associated with a filter of a pre-classifier layer may tested a network traffic property of the network traffic against the range of allowed addresses, such that each of the filters of the traditional layers that classify network traffic based on the range of allowed addresses may check the bit in the associated pre-classifier bit array in lieu of comparing an address property of the network traffic to the range of allowed addresses.

In an example, the enforcer 204 includes pre-classifier layers that classify network traffic based on some or all of the filters, rules, and/or conditions necessary to enforce some or all of the network security policies of a controller (e.g., controller 102, etc.). For example, a pre-classifier bit array for an instance of network traffic, once populated by filters in the pre-classifier layers, includes bits associated with all or some of the conditions of the network security policies of the controller. As a result, all or some of the filters of the traditional layers, whether multidimensional or unidimensional, may classify and/or filter the network traffic by checking bits and/or bitwise operations on the pre-classifier bit array. It depends on the number of pre-classifier layers, and the type of properties of the traditional layers.

In an alternative implementation, if the bits are not bits but instead identifiers (IDs) of the sets are stored (e.g., where the ID of a set is the position of a bit in a bit array-based implementation), then the array of IDs is searched instead of performing bitwise operations.

The pre-classifier layers may be used for rules that have big sets of values of the same property. Hence, instead of having a filter explosion, a pre-classifier bit makes it easier to match. A bit is associated with a set of values of that type that can be pre-classified. Each pre-classifier layer has its own bit space, because they have their own bit arrays. As an example, multiple pre-classifier layers can have bit 1, or bit 3, but they represents different sets of different types.

In an example, a pre-classifier layer 210 is associated with an address property of the network traffic (e.g., a local address, a remote address, a source address, a destination address, etc.). Network addresses may be broken into multiple subnets, each of which represents a subset of network addresses. For instance, the group of network addresses that share the same eight most significant bytes are a subnet. When classifying an address property or other similar property of network traffic, efficient search techniques, such as search trees and/or hashing, may be used. In particular, when the network traffic property can be divided into subnets (or subsets of other values, etc.), classification using a search tree, such as a trie, as described below, is effective.

While some examples are described with reference to a trie, the disclosure is operable with any form of hierarchical tree (e.g., binary trees, etc.).

In an example, a pre-classifier layer 210 of an address property may use a trie, or prefix tree, to classify the address property against filter conditions. The nodes of the trie may each represent a different subnet, with the subnets becoming more specific as the nodes branch further from the root of the trie. Further, each node may represent a filter of the pre-classifier layer and, as the trie is traversed while classifying the address, the results of the filters tested may be included in the pre-classifier bit array. The bits set in the bit array during the trie traversal represent whether the address property matches the subnet (or bitmask) associated with the node. This technique also applies to ports. For instance, a node in a trie may include three possible branches to child nodes. The description of FIG. 4 below further describes use of a trie search technique in a pre-classifier layer 210.

In an example, a pre-classifier layer 210 of a network traffic property may use a hash table of a set of values to classify the network traffic property against filter conditions. Each value of the set of values may be associated with a unique hash value. A hash function associated with the hash table of the pre-classifier layer 210 may be applied to the network traffic property value of the network traffic. If the result of the hash function is an index to a bucket in the hash table that includes the network traffic property value, a bit in the pre-classifier bit array associated with the pre-classifier layer 210 is set to '1'. Alternatively, if the result of the hash function is an index to a bucket that does not contain the network traffic property value, no bits in the pre-classifier bit array associated with the pre-classifier layer 210 are set as a result. The pre-classification process matches all the pre-classifier filters that match, and therefore sets to '1' all the bits indicated by the pre-classifier filters. This means that the pre-classifier filters are associated and generated from the sets of values used in the rules of a high level policy.

It should be understood that search techniques such as those described above may be applied to network traffic properties other than address properties.

In an example, a packet is received. The enforcer 204 may parse the IP header to obtain a local address of the packet. The network security layers (e.g., layers 212-222, etc.) are invoked. The enforcer 204 determines whether the packet is associated with a TCP or UDP connection. Once the enforcer 204 determines that there is a connection, the enforcer 204 classifies the packet against pre-classifier layers 210 (a pre-classifier layer for a remote address, a pre-classifier layer for a local address, pre-classifier layers for ports, etc.). Pre-classifier bit arrays are populated based on the pre-classifier layer classifications. The packet may be filtered in the inbound transport layer 216 and the receive/accept layer 220 based on classifications stored in the pre-classifier bit arrays. If the packet is not blocked by a filter in one of the inbound transport layer 216 and the receive/accept layer 220, the enforcer 204 may complete the connection for the network traffic based on the received packet.

In an example, the enforcer 204 may receive an outbound connection request (e.g., a request associated with outbound traffic 230, etc.) from a process within the same computing device. The enforcer 204 may classify the outbound connection request in the pre-classifier layers 210 (a pre-classifier layer for a remote address, a pre-classifier layer for a local address, pre-classifier layers for ports, etc.). Pre-classifier bit arrays are populated based on the pre-classifier layer classifications. Then, the enforcer 204 may filter the connection request in the connect layer 222 and the outbound transport layer 218, checking against the pre-classifier bit arrays. If the connection request is not blocked by a filter in the connect layer 222 or the outbound transport layer 218, the enforcer 204 may authorize establishing the outbound connection.

In an example, the enforcer 204 may include a trusted network group (TNG) layer that is invoked after pre-classifier layers 210 and before other network security layers (e.g., layers 212-222, etc.). A TNG is a generalization of a pre-classifier layer that is multidimensional. The TNG layer may classify the network traffic according to one or more sets of trusted network groups based on address properties or the like. The TNG layer may behave as a pre-classifier layer in that it may set bits in a TNG bit array based on classifications. Additionally, it may access bits in the pre-classifier bit array(s) to complete the TNG classifications. The TNG layer may include multidimensional filters rather than purely unidimensional filters.

In an example, the controller and/or enforcer may implement Internet protocol security (IPsec) at the network layer (or Internet layer). This may include Internet key exchange (IKE) and authenticated Internet protocol (AuthIP) IPsec Keying Modules (IKEEXT) and security association databases (SA DB). Bits in the pre-classifier bit array may be used to determine a filter of the network security layers that allowed the sending of IPsec key exchange and encrypted communication. The controller and/or enforcer are also applicable to firewall policies, isolation policies, and quality of service (QoS) policies.

While described herein with reference to a bit array, the pre-classifier data may be stored in other forms. For instance, instead of an array of bits, the pre-classifier layers 210 may populate an array of set identifiers, with each possible network traffic classification having a unique set identifier. The network security filters may access the set identifier array to determine which classifications apply to the network traffic and filter the network traffic based on the determination. It should be understood that other data structures may also be used to store pre-classifier classification data such that it may be used by filters in network security layers.

Figure 3:
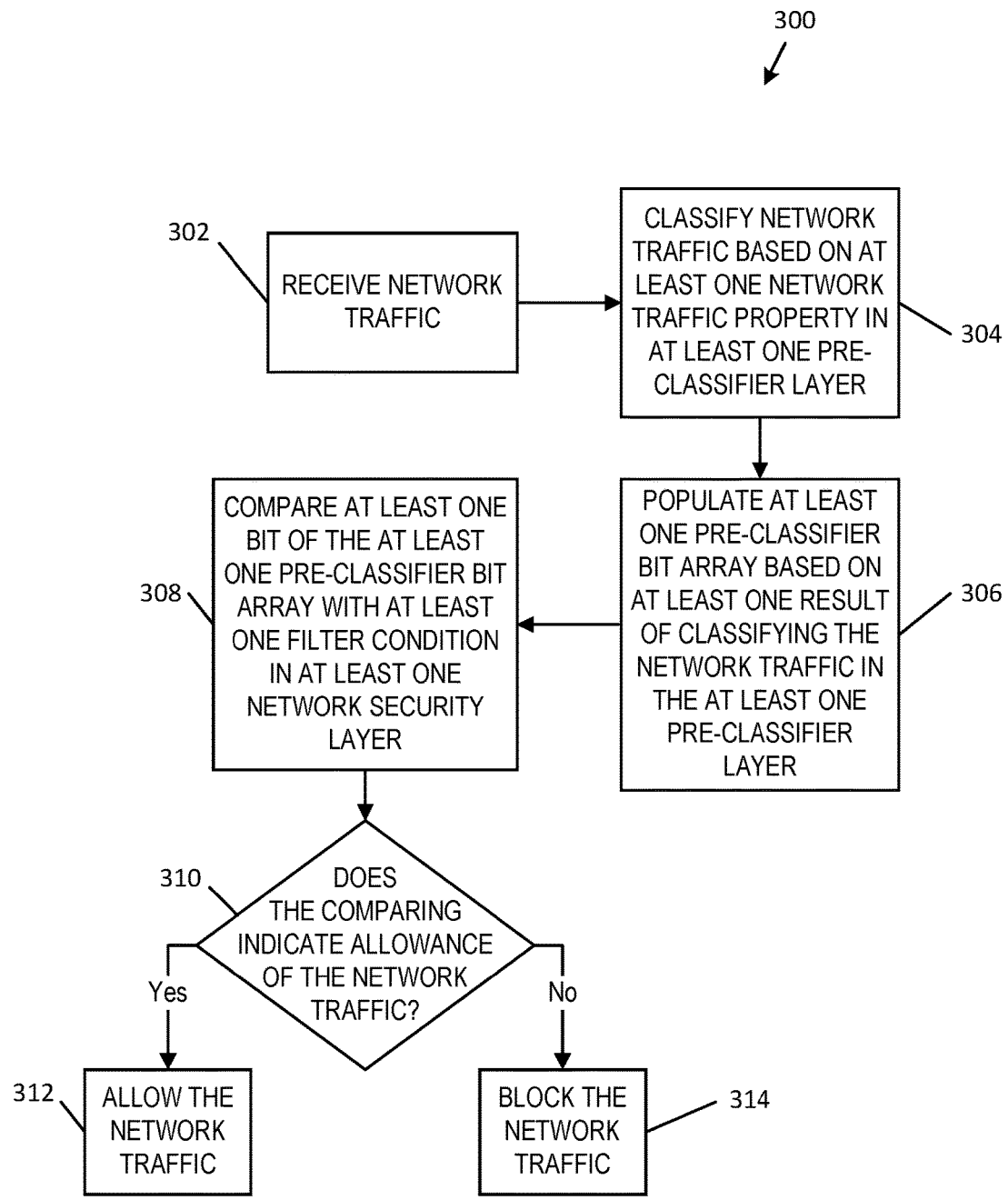
FIG. 3 illustrates a flow chart of an example method of classifying network traffic using a combination of pre-classifier layers and network security layers.

FIG. 3 illustrates a flow chart of a method 300 of classifying network traffic using a combination of pre-classifier layers and network security layers. At 302, a processor (via an enforcer 204 or the like) receives network traffic. While FIG. 3 is described with reference to receiving network traffic, the logic also applies to sending network traffic. That is, the disclosure is operable to classify in both directions (as specific by policy) to block or allow both inbound and outbound traffic. At 304, the processor classifies the network traffic based on at least one network traffic property in at least one pre-classifier layer. Some embodiments contemplate the pre-classifier operating on one property, whereas other implementations may operate on multiple properties. For instance, the processor may classify the network traffic based on an address property of the network traffic. The processor, in a pre-classifier layer, may compare the address property value of the network traffic to a set of addresses. The set of addresses may be associated with a defined classification, such as local addresses or remote addresses. The result of the comparison may indicate that the network traffic may be classified according to the classification of the set of addresses, or not. For instance, if the address property value falls within the set of addresses for a defined remote address classification, the network traffic may be classified as network traffic from a remote address.

At 306, based on at least one result of classifying the network traffic, the processor populates at least one pre-classifier bit array. For instance, in the above example, a bit in the pre-classifier bit array assigned to the remote address classification may be set to '1' when the network traffic matches the conditions for this pre-classifier layer rule. For example, the network traffic may be classified as coming from a remote address set of values (e.g., 1 or N number of them, and a value could be a subnet itself). For addresses, there is a set of address elements. Each element is either a single IP address, a range of IP addresses, or an IP address subnet/bitmask. Alternatively, if the network traffic does not match the conditions for this pre-classifier layer rule, no bit in the pre-classifier bit array assigned to the remote address classification is set. It should be understood that each pre-classifier bit array may include a plurality of bits and each bit of a pre-classifier bit array may be assigned to a separate classification, such as local subnet, Internet, intranet, HTTP proxies, DNS servers, finance machines, etc.

At 308, at least one bit of the at least one pre-classifier bit array is compared with at least one filter condition of a filter in at least one network security layer. In an example, a network security layer may include filters, or rules, for enforcing network security policy, as described above. Each filter may include at least one filter condition, as well as an action to be taken based on the filter condition. For instance, a filter condition may be satisfied when network traffic comes from a set of local addresses and/or uses a port in a defined set of ports. The action to be taken based on satisfaction of the filter condition may be to allow the associated network traffic, or to block the associated network traffic. Each filter may include more than one filter condition and may test more than one network traffic property. Each filter has an associated pre-classifier bit array.

At 310, based on the comparison done at 308, the processor determines an action associated with the compared filter condition. If the comparison indicates that the network traffic should be allowed, the processor allows the network traffic at 312. Alternatively, if the comparison indicates that the network traffic should be blocked, the processor blocks the filter traffic at 314. For example, the result of comparing the condition is true or false (e.g., is the bit there or not). If all the conditions of the filter are true, then the action of the filter (e.g., allow or block) is executed/enforced.

Figure 4:
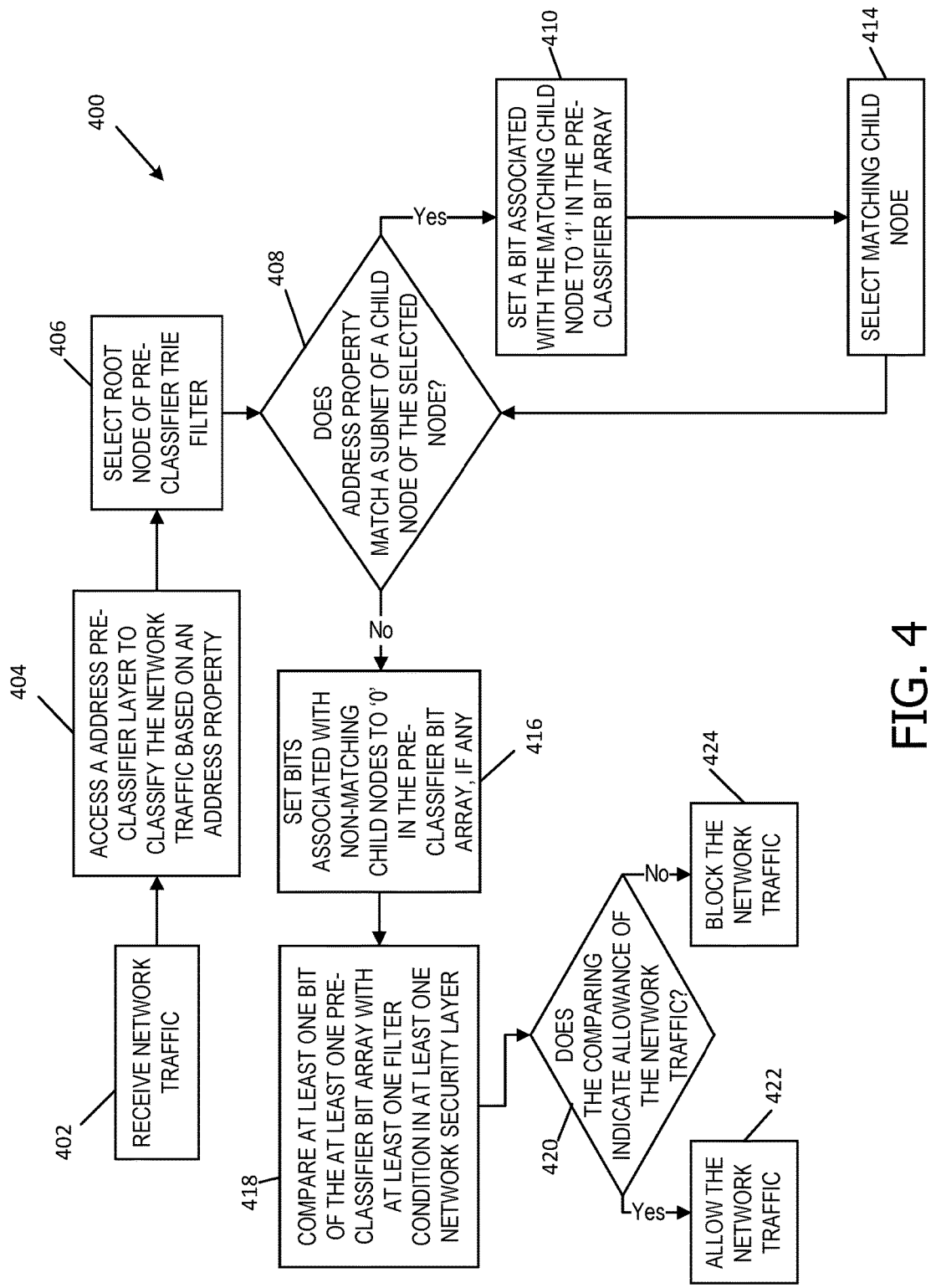
FIG. 4 illustrates a flow chart of an example method of classifying network traffic using a pre-classifier trie search technique.

FIG. 4 illustrates a flow chart of a method 400 of classifying network traffic using a pre-classifier trie search technique. At 402, a processor (via an enforcer software module or the like) receives network traffic. At 404, the processor accesses a pre-classifier layer to classify the network based on an address property. The address property may be a source address property, a destination address property, or the like. The pre-classifier layer includes a pre-classifier trie filter for use in classifying the network address property based on a plurality of subnets, with each node of the trie filter representing a subnet. The subnets become progressively more specific as the trie is traversed away from the root node.

At 406, the root node of the pre-classifier trie filter is selected. In an example, the root node may represent an unlimited subnet that includes all possible subnets, such that all possible address properties match the root node. In an alternative example, the root node may represent the broadest, but limited, subnet of the trie filter. It should be understood that, if the root node represents a limited subnet, the address property may be tested against the limited subnet. If the address property matches the limited subnet, the method 400 may proceed to 408 and a bit of a pre-classifier bit array assigned to the limited subnet may be set to '1'. Alternatively, if the address property does not match the limited subnet, the bit is not set and the method 400 may proceed to 418. It should be understood that the bit is not set to '0' for a non-match because if one filter or a node in the trie is not matched, that does not mean that another node in the trie will not match (and that node might normally have a different bit but could be the same bit. Hence, if the bit was set to '0', that could erase the bit set to '1' by a previous match.

At 408, the processor evaluates each of the subnets associated with the child nodes of the selected node. If the address property matches one of the child nodes of the selected node, then, at 410, a bit is set to '1' in a pre-classifier bit array. If there are non-matching child nodes of the selected node, no bits in the pre-classifier bit array are set as a result of this operation. At 414, the matching child node is selected for evaluation at 408. In this way, the pre-classifier trie filter is traversed to find the most specific subnet to which the address property of the network traffic belongs while recording filter results of less specific subnet filters in the pre-classifier bit array.

If, at 408, the address property does not match any of the subnets associated with child nodes of the selected node, then, at 416, bits are not set in the pre-classifier bit array. If there are no child nodes of the selected node, then no additional bits are set in the pre-classifier bit array.

At 418, at least one bit of the at least one pre-classifier bit array is compared with at least one filter condition of a filter in at least one network security layer as described above in 308 in method 300.

At 420, based on the comparison done at 418, the processor determines an action associated with the compared filter condition. If the comparison indicates that the network traffic should be allowed, the processor allows the network traffic at 422. Alternatively, if the comparison indicates that the network traffic should be blocked, the processor blocks the filter traffic at 424. For example, the result of comparing the condition is true or false (e.g., is the bit there or not). If all the conditions of the filter are true, then the action of the filter (e.g., allow or block) is executed/enforced.

Figure 5:
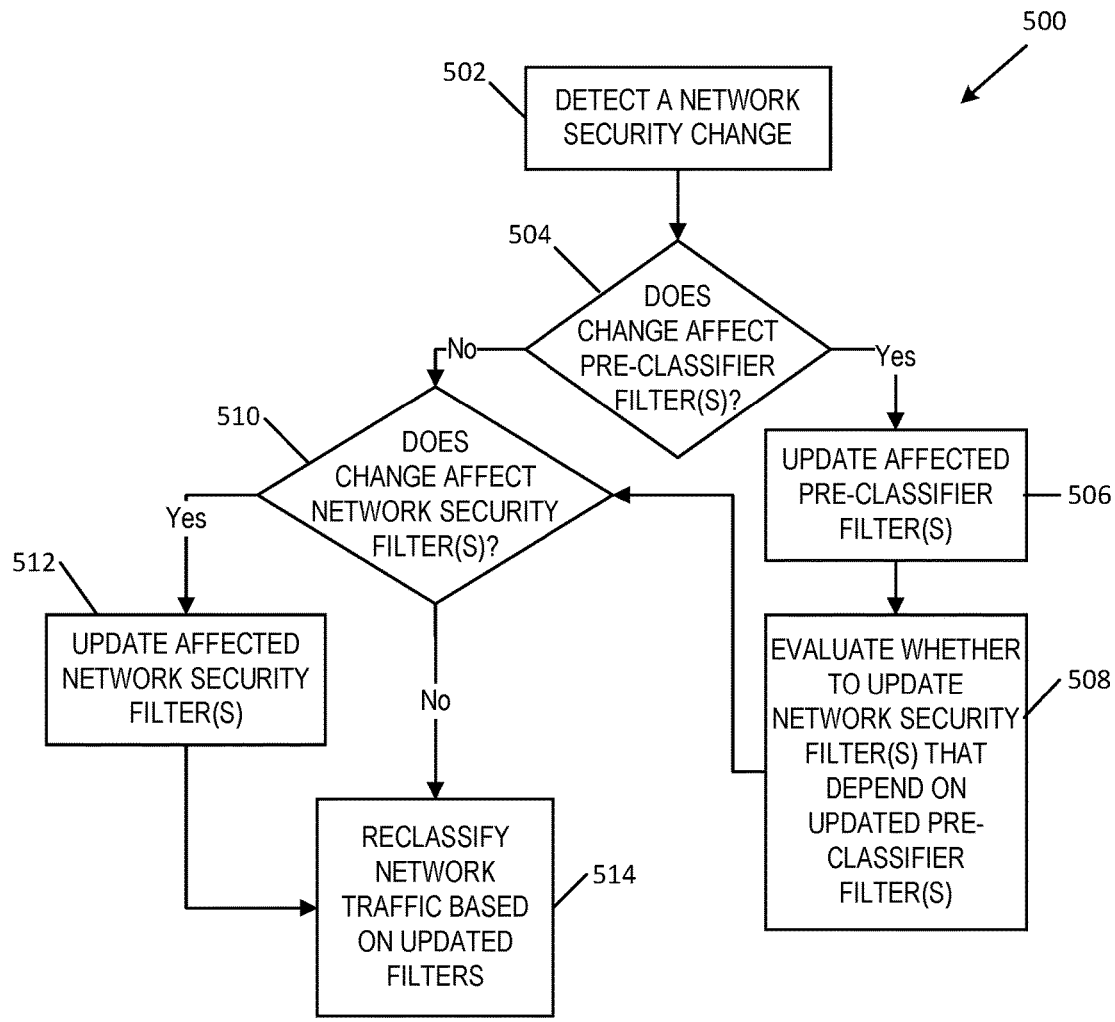
FIG. 5 illustrates a flow chart of an example method of reclassifying network traffic in the event of a network security change that affects pre-classifier layers and/or network security layers.

FIG. 5 illustrates a flow chart of a method 500 of reclassifying network traffic in the event of a network security change that affects pre-classifier layers and/or network security layers. At 502, the processor (which may be executing/running a controller, an enforcer, or both, as described above) detects a network security change. A network security change may be the result of a change to security policy at the controller level, a change to filter conditions and/or classification values due to changing network connections, or the like.

At 504, the processor determines whether the network security change affects pre-classifier filters. Pre-classifier filters may be affected when a new classification is needed, when a set or range of values or individual value used to classify network traffic is altered, or the like. If the network security change does affect pre-classifier filters, the processor updates the affected pre-classifier filters at 506. At 508, any network security filters which depend on the updated pre-classifier filters, may or may not be updated. An evaluation may be performed. For example, if the contents of a set of values are changed, only the pre-classifier filters representing it are changed. Other traditional layer filters simply reference it so they need no change. What might change is the connection flow. For example, if a connection flow has a bit set to '1' in the pre-classifier bit array of the pre-classifier filter that changes, and the filters that change have the bit set in the pre-classifier bit array in the connection, then the connection is pre-classified again. If the pre-classifier bit array of the resultant pre-classification is not the same as before, a re-classification against the subsequent layers is performed. Otherwise, it is not needed. This allows for optimizations in reclassification. If a change happens on a traditional layer, that requires a reclassification, but not a pre-classification.

If, at 504, the processor determines that pre-classifier filters are not affected, or once the updates to the pre-classifier filters and dependent network security filters are complete at 506 and 508, the processor determines if the network security change affects network security filters independently of the pre-classifier filters at 510. Network security changes that affect network security filters may be changes in policy that alter how classifications of the pre-classifier layers are used but do not alter the sets of values or individual values that are used to make the classifications in the pre-classifier layers. For instance, a filter condition in a network security layer filter may be amended to include a different classification which is already being determined in a pre-classifier layer. If the network security change does affect network security filters, the affected filters are updated at 512.

At 514, once all of the affected pre-classifier filters and network security filters are updated in accordance with the detected network security change, the processor reclassifies network traffic based on the updated filters. If pre-classifier filters were updated, reclassifying network traffic includes reclassifying only against the pre-classifier filters. However, if only network security filters were updated, reclassifying network traffic may include reclassifying the network traffic against the network security filters using the previously populated pre-classifier bit array(s). Network traffic that was previously classified against updated filters may be reclassified, while network traffic not classified against the updated filters may not require reclassification. In this manner, reclassification cost is reduced by noticing that the pre-classifier bit array does not change, or if the change is only on the traditional layer and not in the pre-classifier.

Figure 6:
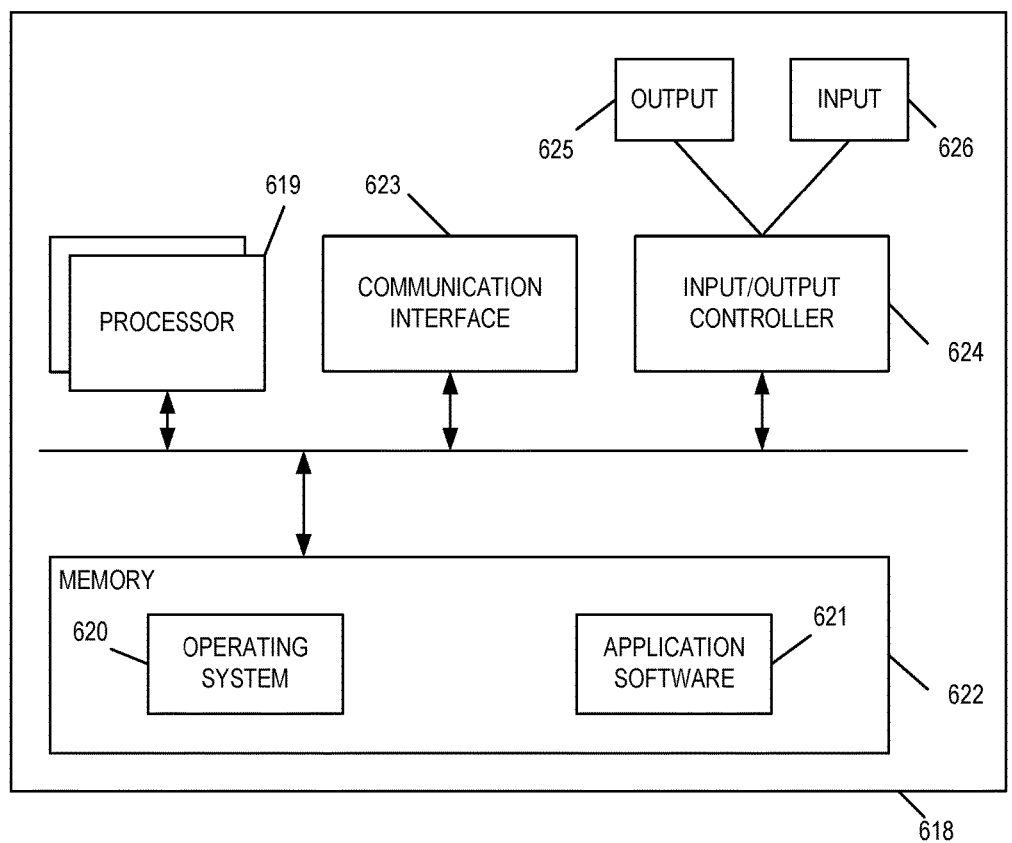
FIG. 6 illustrates an example computing apparatus as a functional block diagram.

FIG. 6 illustrates a computing apparatus 618 according to an embodiment as a functional block diagram. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the apparatus 618 to enable application software 621 to be executed on the device. According to an embodiment, the enforcement of network security policy using pre-classifier layers in addition to traditional network security layers may be accomplished by software. Furthermore, it may receive network traffic from other computing devices via a network or other communication link. Consequently, it may allow and/or deny network traffic based on the network security policy enforcement described herein.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device

625 may also act as the input device. An example of such a device may be a touch sensitive display. The input/output controller 624 may also output data to devices other than the output device, e.g. a locally connected printing device.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Alternatively, or in addition to the other examples described herein, examples include any combination of the following:

A system comprising:
at least one processor; and
at least one memory comprising computer program code, the at least one memory and the computer program code configured to, with the at least one processor, cause the at least one processor to:
classify, in a pre-classifier layer, network traffic based on a network traffic property;
set a bit in a pre-classifier bit array in response to classifying the network traffic in the pre-classifier layer, wherein the bit represents a classification of the network traffic, or a set of values or properties of network traffic;
comparing, in a network security layer, a filter condition to the bit in the pre-classifier bit array;
when a result of comparing the filter condition to the bit in the pre-classifier bit array indicates allowance of the network traffic, allow, in the network security layer, the network traffic; and
when the result of comparing the filter condition to the bit in the pre-classifier bit array indicates denial of the network traffic, deny, in the network security layer, the network traffic.

The system described above wherein the pre-classifier layer is unidimensional and the network security layer is multidimensional.

The system described above wherein classifying the network traffic based on a network traffic property includes comparing a network traffic property value to a set of elements.

The system described above wherein comparing the network traffic property value to a set of elements includes hashing the network traffic property value.

The system described above wherein the network traffic property is an address and comparing the network traffic property value to a set of elements includes searching a trie comprised of subnets.

The system described above wherein setting a bit in the pre-classifier bit array further includes setting a bit in the pre-classifier bit array for each tested node in the trie, each set bit representing that the network traffic property value matches a subnet associated with the node or the network traffic property value does not match the subnet associated with the node.

The system described above wherein the network security layer includes at least one of a network layer, a transport layer, or an application layer.

The system described above wherein the network traffic is associated with at least one of transmission control protocol (TCP), user datagram protocol (UDP), hypertext transfer protocol (HTTP), file transfer protocol (FTP), simple mail transfer protocol (SMTP), or Telnet.

The system described above wherein comparing the filter condition to the bit in the pre-classifier bit array includes performing a bitwise operation on the pre-classifier bit array.

The system described above the at least one memory and the computer program code configured to, with the at least one processor, further cause the at least one processor to:
receive, by a controller, a network security policy;
configure, by the controller, the pre-classifier layer according to the network security policy; and
configure, by the controller, the network security layer according to the network security policy.

A computerized method comprising:
receiving, by a processor, network traffic;
classifying, in at least one pre-classifier layer, the network traffic based on at least one network traffic property (and this can be offloaded to hardware in some implementations);
populating, by the processor, at least one pre-classifier bit array based on at least one result of classifying the network traffic in the at least one pre-classifier layer;
comparing, in at least one network security layer, at least one bit of the at least one pre-classifier bit array with at least one filter condition;
allowing, in the at least one network security layer, the network traffic when the comparing indicates allowance of the network traffic; and
blocking, in the at least one network security layer, the network traffic when the comparing indicates blocking of the network traffic.

The computerized method described above wherein the at least one pre-classifier layer is unidimensional and at least one network security layer of the at least one network security layer is multidimensional.

The computerized method described above wherein classifying the network traffic based on at least one network traffic property includes comparing the at least one network traffic property value to at least one set of elements.

The computerized method described above further comprising:
receiving, by the processor, a network security policy associated with the at least one set of elements;
configuring, by the processor, the at least one pre-classifier layer according to the network security policy; and
configuring, by the processor, the at least one network security layer according to the network security policy.

The computerized method described above wherein configuring the at least one pre-classifier layer according to the network security policy includes:
creating a pre-classifier layer for each of the at least one network traffic property;

creating, in each pre-classifier layer, a pre-classifier filter for each element of the at least one set of elements associated with the network traffic property of the pre-classifier layer; and assigning a bit in the at least one pre-classifier bit array to each pre-classifier filter.

The computerized method described above wherein configuring the at least one network security layer according to the network security policy includes creating, in at least one network security layer, at least one filter including at least one filter condition.

The computerized method described above further comprising invoking a trusted network group layer after the at least one pre-classifier layer and before the at least one network security layer.

The computerized method described above wherein the network traffic is one of inbound network traffic or outbound network traffic.

One or more computer storage media storing a plurality of pre-classifier filters, storing a plurality of network security filters, and having computer-executable instructions that, upon execution by a processor, cause the processor to at least:

receive network traffic;

classify the network traffic based on the plurality of pre-classifier filters;

populate at least one pre-classifier bit array based on classifying the network traffic;

compare at least one bit of the at least one pre-classifier bit array with at least one filter condition of at least one network security filter of the plurality of network security filters;

allowing the network traffic through the at least one network security filter when the comparing indicates allowance of the network traffic; and blocking the network traffic at the at least one network security filter when the comparing indicates blocking of the network traffic.

The one or more computer storage media described above further having computer-executable instructions that, upon execution by a processor, cause the processor to at least:

detect a network security change associated with at least one of the plurality of pre-classifier filters or at least one of the plurality of network security filters;

when the network security change affects at least one pre-classifier filter of the plurality of pre-classifier filters, update the at least one affected pre-classifier filter and update network security filters of the plurality of network security filters that depend on the at least one affected pre-classifier filter;

when the network security change affects at least one network security filter of the plurality of network security filters, update the at least one affected network security filter;

when at least one pre-classifier filter is updated, reclassify network traffic based on the at least one updated pre-classifier filter; and when at least one network security filter is updated, reclassify network traffic based on the at least one updated network security filter.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for pre-classifying network traffic using unidimensional pre-classifier filters. The illustrated one or more processors 619 together with the computer program code stored in memory 622 constitute exemplary processing means for pre-classifying network traffic and preserving resulting pre-classifications in a bit array for later use in network security layers.

The term "comprising" is used in this specification to mean including the feature(s) or act(s) followed thereafter, without excluding the presence of one or more additional features or acts.

The invention claimed is:

1. A system comprising:
   at least one computer processor; and
   at least one memory comprising computer program code configured to cause the at least one computer processor to:
   create a pre-classifier layer for a network traffic property according to a network security policy, the pre-classifier layer having a pre-classifier filter for each element of a set of elements associated with the network traffic property;
   classify, in the pre-classifier layer, inbound or outbound network traffic based on the network traffic property;
   set a bit in a pre-classifier bit array for each pre-classifier filter based on classifying the network traffic in the pre-classifier layer, wherein the bit represents a classification of the network traffic; and
   allow or deny, in a network security layer, the network traffic based on the bit in the pre-classifier bit array.

2. The system of claim 1, wherein the pre-classifier layer is unidimensional and the network security layer is multidimensional.

3. The system of claim 1, the at least one memory and the computer program code configured to, with the at least one computer processor, further cause the at least one computer processor to:
   compare, in the network security layer, a filter condition to the bit in the pre-classifier bit array;
   allow or deny, in the network security layer, the network traffic based on a result of the comparing the filter condition to the bit in the pre-classifier bit array.

4. The system of claim 1, wherein classifying the network traffic includes comparing a network traffic property value to the set of elements hashing the network traffic property value.

5. The system of claim 4, wherein the network traffic property is an address and comparing the network traffic property value to the set of elements includes searching a trie comprised of subnets.

6. The system of claim 5, wherein setting a bit in the pre-classifier bit array further includes setting a bit in the pre-classifier bit array for each tested node in the trie, each set bit representing that the network traffic property value matches a subnet associated with a node.

7. The system of claim 3, wherein comparing the filter condition to the bit in the pre-classifier bit array includes performing a bitwise operation on the pre-classifier bit array.

8. The system of claim 1, wherein the network security layer includes at least one of a network layer, a transport layer, or an application layer.

9. The system of claim 1, wherein the network traffic is associated with at least one of transmission control protocol (TCP), user datagram protocol (UDP), hypertext transfer protocol (HTTP), file transfer protocol (FTP), simple mail transfer protocol (SMTP), or Telnet.

10. The system of claim 1, the at least one memory and the computer program code configured to, with the at least one computer processor, further cause the at least one computer processor to:
receive, by a controller, the network security policy;
configure, by the controller, the network security layer according to the network security policy.

11. A computerized method comprising:
receiving, by a computer processor, network traffic;
creating at least one pre-classifier layer for at least one network traffic property according to a network security policy, the at least one pre-classifier layer having a pre-classifier filter for each element of a set of elements associated with the at least one network traffic property;
classifying, in the at least one pre-classifier layer, the network traffic based on the at least one network traffic property;
populating, by the processor, at least one pre-classifier bit array based on at least one result of classifying the network traffic in the at least one pre-classifier layer, the populating comprising setting a bit in the at least one pre-classifier bit array for each pre-classifier filter based on classifying the network traffic in the pre-classifier layer, wherein the bit represents a classification of the network traffic;
allowing or denying, in at least one network security layer, the network traffic based on the bit in the pre-classifier bit array.

12. The computerized method of claim 11, wherein the at least one pre-classifier layer is unidimensional and the at least one network security layer is multidimensional.

13. The computerized method of claim 12, further comprising:
receiving, by the processor, the network security policy associated with the at least one set of elements;
configuring, by the processor, the at least one network security layer according to the network security policy.

14. The computerized method of claim 13, further comprising comparing, in the at least one network security layer, at least one bit of the at least one pre-classifier bit array with at least one filter condition, and allowing or denying, in the network security layer, the network traffic based on a result of the comparing the at least one filter condition to the bit in the pre-classifier bit array.

15. The computerized method of claim 14, further comprising configuring, in the at least one network security layer, at least one filter to include the at least one filter condition.

16. The computerized method of claim 11, wherein classifying the network traffic based on at least one network traffic property includes comparing at least one network traffic property value to the at least one set of elements.

17. The computerized method of claim 11, further comprising invoking a trusted network group layer after the at least one pre-classifier layer and before the at least one network security layer.

18. The computerized method of claim 11, wherein the network traffic is at least one of inbound network traffic or outbound network traffic.

19. One or more computer storage media storing a plurality of pre-classifier filters and a plurality of network security filters, and having computer-executable instructions that, upon execution by a processor, cause the processor to at least:
receive network traffic;
classify, in at least one pre-classifier layer, the network traffic based on the plurality of pre-classifier filters, the plurality of pre-classifier filters creating the at least one pre-classifier layer for at least one network traffic property according to a network security policy defined by the plurality of network security filters, the pre-classifier layer having a pre-classifier filter for each element of a set of elements associated with the at least one network traffic property;
populate at least one pre-classifier bit array based on classifying the network traffic, the populating comprising setting a bit in at least one pre-classifier bit array for each pre-classifier filter based on classifying the network traffic in the pre-classifier layer, wherein the bit represents a classification of the network traffic;
allow or deny the network traffic in at least one network security layer based on the bit in the pre-classifier bit array.

20. The one or more computer storage media of claim 19, further having computer-executable instructions that, upon execution by a processor, cause the processor to at least:
detect a network security change associated with at least one of the plurality of pre-classifier filters or at least one of the plurality of network security filters;
when the network security change affects at least one pre-classifier filter of the plurality of pre-classifier filters, update the at least one affected pre-classifier filter and update network security filters of the plurality of network security filters that depend on the at least one affected pre-classifier filter;
when the network security change affects at least one network security filter of the plurality of network security filters, update the at least one affected network security filter;
when at least one pre-classifier filter is updated, reclassify network traffic based on the at least one updated pre-classifier filter; and
when at least one network security filter is updated, reclassify network traffic based on the at least one updated network security filter using the at least one pre-classifier bit array.

* * * * *